United States Patent [19]

Nagamatsu

[11] Patent Number: 4,590,398

[45] Date of Patent: May 20, 1986

[54] BRUSH HOLDER

[75] Inventor: Toshio Nagamatsu, Iruma, Japan

[73] Assignee: Kabushiki Kaisha Yaskawa Denki Seisakusho, Fukuoka, Japan

[21] Appl. No.: 657,400

[22] Filed: Oct. 3, 1984

[30] Foreign Application Priority Data

Feb. 3, 1984 [JP] Japan ........................... 59-13212[U]

[51] Int. Cl.[4] ........................................ H02K 13/00

[52] U.S. Cl. ........................................ 310/239; 310/42; 310/71; 29/597

[58] Field of Search ............... 310/239, 240, 241, 242, 310/244, 245, 246, 247, 71, 248, 249, 42; 29/597

[56] References Cited

U.S. PATENT DOCUMENTS 3,454,803 7/1969 Shaler .................................. 310/245

3,656,018 4/1972 Mahler ................................ 310/242

FOREIGN PATENT DOCUMENTS 2712721 9/1978 Fed. Rep. of Germany ...... 310/242

2110833 6/1983 United Kingdom ................ 310/242

*Primary Examiner*—R. Skudy

*Attorney, Agent, or Firm*—Ladas & Parry

[57] ABSTRACT

A brush holder comprising a brush box and a brush terminal. The brush box includes a brush sliding tube which is mounted at opposite upper sides thereof with a pair of side plates. Each of the side plates forms a clearance and has an upper opening and a lower opening. The brush terminal has a pair of bent pieces and a central portion therebetween for connecting a pigtail. An engaging projection is formed on the bent pieces. The engagement and fixation between the brush box and the brush terminal are performed outside of the brush box, with the engaging projection coupling to the lower opening, and the bent pieces inserted into the clearance.

5 Claims, 8 Drawing Figures

BRUSH HOLDER

BACKGROUND OF THE INVENTION

1. Field of the technique

The present invention relates to a brush holder which is applied to a small size electric motor or other devices.

2. Prior art

One example of a prior art brush holder of a small size is disclosed in Japanese Utility Model Publication No. 56-31166. FIG. 1 is a disassembled perspective view of the brush holder shown in the Publication, and FIG. 2 is a sectional view illustrating a main part of the brush holder of FIG. 1 after it is assembled. In the figure, reference numeral 101 denotes a brush box, numerals 101*a* and 101*b* denote slits formed at opposite sides of the brush box 101 and numeral 103 denotes a top plate including bent pieces 103*c* and 103*d* opposing to each other which are to be inserted into the brush box 101, the bent pieces 103*c* and 103*d* being provided with nails 103*a* and 103*b* capable of engaging with the slits 101*a* and 101*b*. Numeral 107 denotes a solder portion connecting a pigtail 104 and the top plate 103. Numerals 102 and 105 denote a brush and a brush spring, respectively.

With the structure as above, the top plate 103 is fixed to the brush box 101 by engaging the nails 103*a* and 103*b* of the top plate 3 with the slits 101*a* and 101*b* of the brush box 101.

In the prior art brush holder, a brush terminal 103 (top plate) formed by bending is directly inserted for fixation thereof within the interior of the brush box 101 constituting a sliding surface for the brush 102, so that the upper end of the brush spring 105 locates at the position lower than the upper end of the brush box 101. Therefore, the brush box must cover this additional length beside that for the brush 102, which results in a longer brush holder. It is a problem for miniaturization of an electric motor.

Further, in the prior art brush holder, the longer the height of the bent pieces 103*c* and 103*d* of the brush terminal 103, the easier the bending operation of the opposing side portions and the insertion of the brush terminal 103 into the brush box 101 become. However, this seriously leads to the above problem that the length of the brush box becomes larger. Thus, it is necessary to shorten the length of the height. However, a larger force is required to bend the opposing sides or the nails 103*a* and 103*b*. It becomes difficult to insert the brush terminal 103 into the brush box 101.

SUMMARY OF THE INVENTION

It is therefore an object of the present invention to overcome the prior art problems and to provide a brush holder with a simple structure which can be assembled with ease and certainty.

The brush holder of the present invention comprises (1) a brush box including a brush sliding tube, the brush sliding tube being mounted at opposite upper sides thereof with a pair of side plates, each of the side plates forming a clearance and having an upper opening and a lower opening; (2) a brush terminal bent to form a generally U-shaped section having an upper opening and having a pair of bent pieces at opposite ends and a central portion therebetween for connecting a pigtail; and (3) an engaging projection formed on at least one of the pair of bent pieces, wherein the brush terminal is fixed to the brush box such that the pair of bent pieces are inserted into the clearances at the opposite sides of the brush sliding tube, and that the engaging projection of the bent pieces is engaged with the lower opening.

The above object, other objects and advantages of the present invention may be readily ascertained by referring to the following description and appended drawings.

DETAILED DESCRIPTION OF PREFERRED EMBODIMENTS

One embodiment of the present invention is now described.

Figure 3:
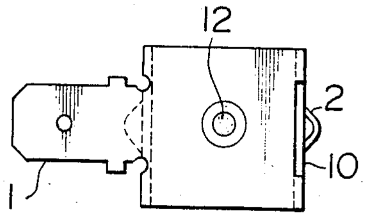
FIGS. 3 to 5 are views of the brush connecting structure according to one embodiment of the present invention, showing a plan view, side view of the structure, and a perspective view of the brush terminal, respectively.
Figure 4:
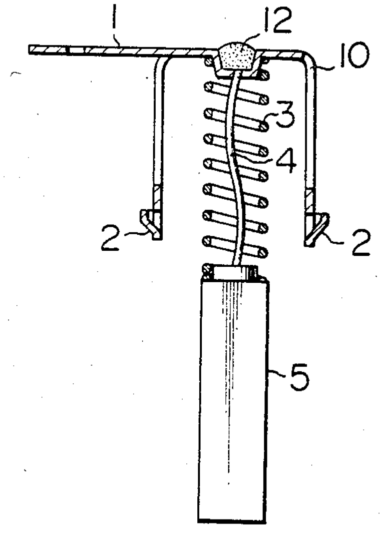
Figure 5:
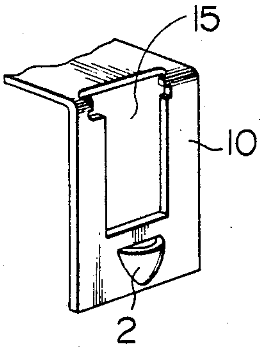

FIG. 3 is a plan view of a brush connecting structure, FIG. 4 is a side view of the structure, and FIG. 5 is a perspective view of the brush terminal of the structure. A brush terminal is bent to form a generally U-shaped section having an upper opening 15 and has a pair of bent pieces 10 at opposite ends and a central portion therebetween for connecting a pigtail 4. One of the bent pieces 10 is partially cut and extended to form an electrical contact 1, and the other of the bent pieces 10 is also partially cut out so that flexibility for both bent pieces 10 may substantially be balanced and maintained equal. Further, at the same time, engaging projections 2 are formed.

A brush 5 is connected to the brush terminal and to the solder connecting portion 12 through the pigtail 4. Numeral 3 denotes a brush spring.

Figure 6:
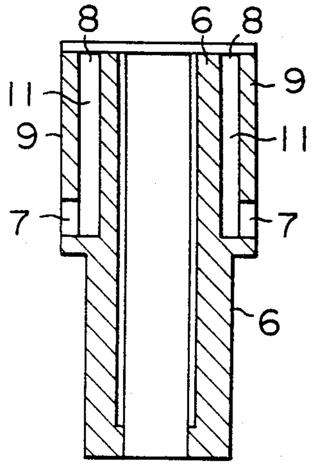
FIG. 6 is a sectional side view of the brush box in which the brush connecting structure is accommodated and assembled.

FIG. 6 is a sectional side view of the brush connecting structure in which a brush box is accommodated and is assembled.

The brush box or brush holder includes a brush sliding tube 6 at opposite upper sides thereof. Each of the side plates 9 forms a clearance 11 and has an upper opening 8 and a lower opening 7. The side plates 9 are made integrally with the brush sliding tube 6.

The side plates 9 and the brush sliding tube 6 are made of, for instance, a synthetic resin, and are molded into an integral member. The lower opening 7 is not provided in the entire circumference, but is provided in one part of each side plate 9. The sectional areas of the tube 6 and the side plates 9 are protions of the same member.

Figure 7:
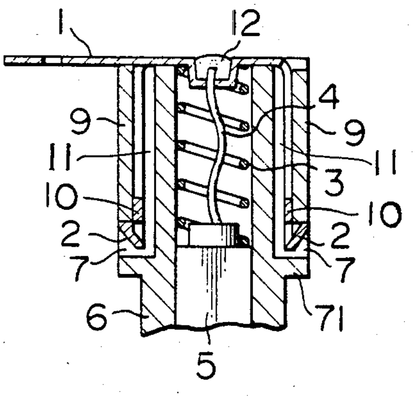
FIG. 7 is a sectional side view of the embodiment of the brush holder according to the present invention.

FIG. 7 is a sectional view of an embodiment of the brush holder.

The pair of bent pieces 10 are inserted into the clearances 11 at the opposite sides of the brush sliding tube 6, and the engaging projections 2 on the bent pieces 10 are engaged with the lower openings 7 formed in the side plates 9. Thus, the brush terminal is fixed to the brush box. The engaging projections 2 are extending or opening to the outside of the brush sliding tube 6.

Figure 8:
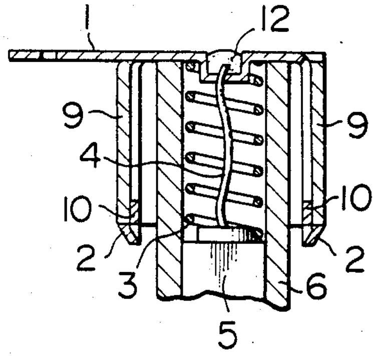
FIG. 8 is a sectional side view of another embodiment of the brush holder according to the present invention.

FIG. 8 is a sectional side view of another embodiment according to the present invention.

In this embodiment, lower openings 7 are formed in side plates 9 mounted at opposite sides of a brush sliding tube and are formed by cutting out marginal portions 71 shown in FIG. 7.

The following modifications may be thought of as other embodiments of the present invention.

Figure 1:
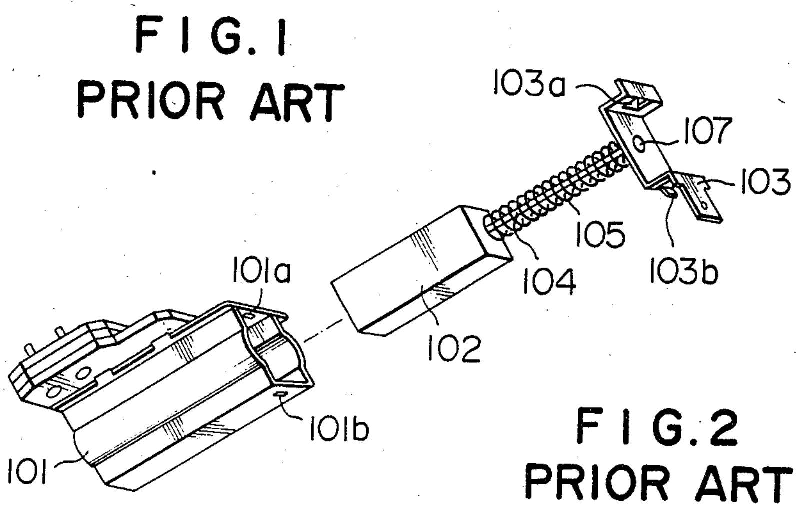
FIG. 1 PRIOR ART
FIG. 1 is a disassembled perspective view of a prior art brush holder.
Figure 2:
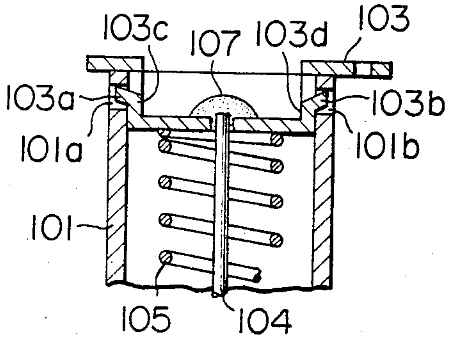
FIG. 2 PRIOR ART
FIG. 2 is a sectional view of the brush holder shown in FIG. 1 after it is assembled.

(1) Instead of using the engaging projection of a semispindle shape as shown in FIG. 5, other configurations such as the nails 103*a* and 103*b* shown in FIG. 2 may also be employed.

(2) The dimension of the clearance formed by the brush sliding tube 6 and the side plate 9 is made larger than that, in a direction of thickness, of the engaging projection 2 of the bent piece 10.

As seen from the above description, the following effects can be obtained from the present invention, which are beneficial in the field of this technology.

(1) Since the engagement and fixation between the brush terminal and the brush box are carried out outside of the brush sliding tube, the whole length of the brush sliding tube can be used for supporting the brush so that the brush box is made shorter in length. Thus, it is effective in that the motor may be miniaturized.

(2) Since the engagement and fixation between the brush terminal and the brush box are carried out outside of the brush sliding tube, the length of the bent pieces of the brush terminal can be shortened. Therefore, the insertion of the bent pieces into the clearance aside of the brush box becomes easy, and the fixation of the brush terminal to the brush box becomes simple.

Having described specific embodiments of the present invention, it should be understood that modification and variation of the invention are possible in light of the above teaching.

What is claimed is:

1. A brush holder comprising:

a brush box including a brush sliding tube, said brush sliding tube being mounted at opposite upper sides thereof with a pair of side plates, each of said side plates forming a clearance and having an upper opening and a lower opening; and a brush terminal bent to form a generally U-shaped section having an upper opening and having a pair of bent pieces at opposite ends and a central portion therebetween for connecting a pigtail, at least one of said pair of bent pieces being provided with an engaging projection, said projection opening to the outside of said brush sliding tube, and one of said pair of bent pieces being partially cut and extended to form an electrical contact, said brush teminal is fixed to said brush box such that said pair of bent pieces are inserted into said clearances at the opposite sides of said brush sliding tube, and that said engaging projection of said bent pieces is engaged with said lower opening of each of said side plates.

2. A brush holder as set forth in claim 1, in which said lower opening of said side plate is formed in lower portion of said side plate.

3. A brush holder as set forth in claim 1 or 2, in which outer surfaces of said pair of bent pieces contact under pressure with inner surfaces of said pair of side plates.

4. A brush holder as set forth in claim 1, in which dimension of said clearance is larger than that, in a direction of thickness, of said engaging projection of at least one of said bent pieces.

5. A brush holder as set forth in claim 3, in which dimension of said clearance is larger than that, in a direction of thickness, of said engaging projection of at least one of said bent pieces.

* * * * *